Figure 1:
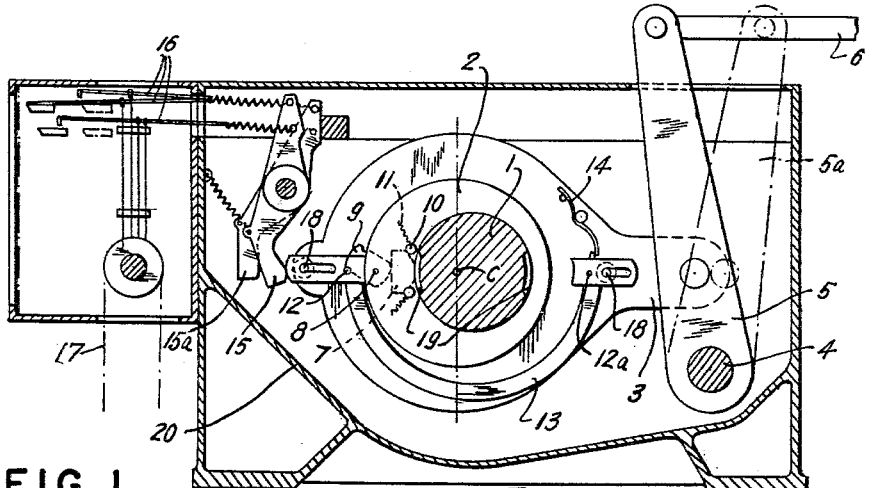

United States Patent Office 3,180,366
Patented Apr. 27, 1965

3,180,366
SHED FORMING DEVICE FOR LOOMS
Ernst Hoenig, Horgen-Zurich, Switzerland, assignor to Gebr. Stäubli & Co., Horgen-Zurich, Switzerland, a Swiss corporation
Filed Feb. 5, 1962, Ser. No. 171,107
Claims priority, application Switzerland, Mar. 7, 1961, 2,812/61
6 Claims. (Cl. 139—66)

The invention relates to a shed-forming device for looms.

Various devices and their controls are known, by means of which the healds of looms are brought into the positions desired.

Shed-forming devices, in which the up-and-down movement is imparted to the healds by means of eccentrics instead of by swinging draw knives with draw hooks to be attached to them and with pull- or push-members, are known particularly with looms for the production of taffeta.

The eccentric drive, by means of which the rotational driving movement is converted under the best conditions into a reciprocating movement for the healds, could not hitherto be used for weaving any patterns desired since a safe, quickly operating release mechanism was not known in connection with an eccentric.

A known shed-forming device, which uses an eccentric for converting the rotational driving movement into a reciprocating movement, has for each heald a gear pinion with a connecting rod articulated to it eccentrically. These gear pinions are, in accordance with the pattern, alternately brought into mesh with two toothed rollers rotating in opposite directions. These toothed rollers have gear teeth on half their circumference only. Upon a gear pinion meshing with one of the toothed rollers the heald is moved up, and upon meshing with the other toothed roller is moved down into the position of the low shed. This shed-forming mechanism is known under the name of Crompton Knowles machine. Accordingly two drive shafts are required for this machine, since the gear pinions carrying the connecting rods are journalled between two driving toothed rollers. When in the mechanism described the gear pinion is brought into mesh with one or the other toothed roller, the engagement of the first tooth of the toothed roller with the tooth of the gear pinion takes place impact-like, and this the more so, the faster the machine runs. The present invention has the object of providing a simple shed-forming device for looms, which makes it possible to couple the drive of the healds to a driving shaft by means of eccentrics and into connection with a pattern card mechanism by means of appropriate transmission elements, in such a manner, that with fast running looms having many healds the latter can be moved at will in accordance with the pattern card. The invention has moreover the object of converting the rotational driving movement in accordance with the pattern card at will into a reciprocating movement for the formation of the shed, this conversion to be effected as accurately and impactless as possible even at major speeds of working, while obviating great wear of the device by friction.

With these and other objects in view which will become apparent later from this specification and the accompanying drawings, I provide a shed-forming device for looms having a plurality of healds, comprising in combination: a driving shaft, a plurality of eccentrics mounted idly on said shaft, each of said eccentrics being associated with one of the healds, the extreme positions of said eccentrics corresponding to the high shed and low shed positions, respectively, of their associated sheds, a plurality of coupling means each associated with one of said eccentrics and capable of coupling the same to said driving shaft, a pattern card mechanism in driving connection with said shaft, control members actuated by said pattern card mechanism and controlling said coupling means, alternately engaging and disengaging the latter in accordance with the actual pattern of said mechanism, and transmission members operatively connetcing each of said eccentrics with its associated heald.

The coupling between the driving shaft and the eccentric disc may be single-acting or double-acting, or two single-acting couplings may be built in. When the shed has to be arrested in an intermediate position or in the two extreme positions only, a correspondingly greater number of controlling release members may be provided.

In addition to the fact, that the up-and-down movement of the healds is derived from a rotating eccentric, the device may run in an oil bath and may also be so constructed that the eccentrics, which are mounted on an opposite gear wheel and carry the eccentric rods for connection to the healds, are driven from a driving shaft by means of gear wheels, or alternatively, that the eccentrics are mounted directly on a continuously rotating shaft, a coupling capable of being controlled by the pattern card being provided between the driving shaft and the gear wheel or between the driving shaft and the eccentrics mounted thereon.

In a preferred embodiment of the invention, I provide a driving shaft having at least one shallow longitudinal groove, a plurality of eccentric discs mounted idly on said shaft, in each said discs a wedge guided in the radial direction, a double-armed lever pivotally mounted in said eccentric disc about an axis parallel to said shaft and with one arm co-operating with said wedge, a pair of rolling bodies interposed in said groove between said wedge and said shaft and spring-biased towards the apex of said wedge, stationary abutments slidable radially relative to the axis of said driving shaft and capable of co-operating with the other arm of said double-armed lever, a pattern card mechanism, control members operatively connecting said slidable stationary abutments to said pattern card mechanism, said abutments when under the action of said pattern card mechanism moving into contact with one arm of their associated double-armed lever and deflecting the same, the other arm of said lever forcing said wedge between said rolling bodies against their spring bias and jamming the same against said driving shaft, thereby temporarily coupling said eccentric disc to said shaft, an eccentric rod mounted on each of said eccentric discs and operatively connected to one of the healds.

Figure 2:
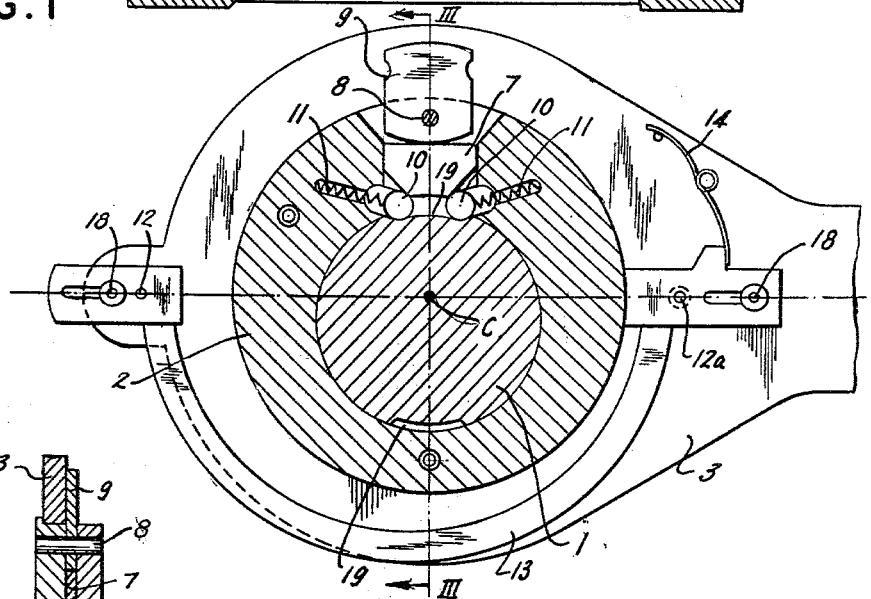
Figure 3:
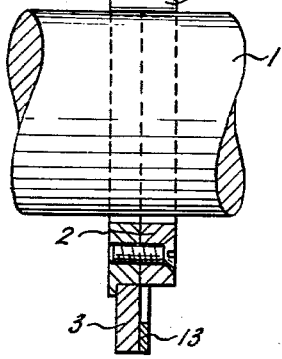

These and other features of my said invention will be readily understood from the following description of two embodiments thereof given by way of example and illustrated in the accompanying drawings, in which:

FIG. 1 is an elevation of a double-acting eccentric with the coupling disengaged, built into a shed-forming device with pattern card control for looms, FIG. 2 is an elevation, partly in section, on a larger scale, of the same eccentric, with the coupling engaged, and FIG. 3 is a section on the line III—III of FIG. 2.

The shed-forming device shown in FIG. 1 corresponds to the high shed position of a heald (not shown). On the driving shaft 1 the eccentric disc 2 is mounted, on which in turn the connecting rod 3 is mounted. To the connecting rod 3 a rocker 5 is articulated which is pivotable about the axle 4 and effects the heald movement through linkage 6. The coupling between the eccentric disc 2 and the driving shaft 1 consists of a wedge 7 acted upon on the one hand by a lever 9 pivoting about an axle 8 and, on the other hand, by two roller bodies, such as rollers or balls 10, which are in turn biased by springs 11, and act each on one face of the wedge 7. Abutments 12 and 12a for the lever 9 are fixedly mounted on a yoke 13, which is held by a spring 14 which is fastened onto the connecting rod 3, thus pushing the yoke 13 into the position illustrated in FIG. 2. By means of a rocker 15, which is controlled by draw needles 16 in accordance with the pattern card 21, the yoke 13 may be brought into the position illustrated in FIG. 1, sliding on pins 18 which are also fixedly mounted on the connecting rod 3. Shallow grooves 19 are provided in the shaft 1.

The coupling according to FIGS. 1–3 functions in the following manner: when the lever 9 abuts one of the abutments 12 or 12a, respectively, said lever is rocked, and the wedge 7 is forced towards the center C of the eccentric disc, the rollers or balls 10 being pushed back against the bias of the springs 11. When controlled by the pattern card 21, the rocker 15 is then brought into the position 15a, the spring 14 forces the yoke 13 to the left into the position according to FIG. 2. The lever 9 is freed, and the springs 11 push the rollers 10 against the driving shaft, 1. As soon as one of the grooves 19 slides past the rollers, the latter engage into said groove, push the wedge 7 back as far as the lever 9 permits and then jam, so that the eccentric disc 2 is carried along by the driving shaft (position of FIG. 2), until the lever 9 abuts again on abutment 12 or 12a, respectively, and by its rocking brings the rollers again out of engagement with the groove 19. Depending on the number of abutments 12 distributed over the circumference, the eccentric disc 2 may be detained in any position desired. Thereby also the stroke of the eccentric rod 3 is determined. The position of the rocker shown in dotted lines and indicated by 5a in FIG. 1 corresponds to the low shed position of the heald, when the lever 9 abuts the abutment 12a.

The embodiment of the coupling illustrated in FIGS. 1–3 permits the carrying along of the eccentric disc 2 independently of the sense of rotation of the driving shaft 1. The coupling of the embodiment of FIGS. 1 to 3 is thus double-acting, i.e., during either direction of rotation of the shaft, the coupling can be closed or opened.

With the heald drive according to the invention the driving is derived from a rotating member which in its rotary movement carries along an eccentric. The heald itself, which performs a linear movement is continually accelerated and braked by the eccentric which is mechanically of advantage in respect of inertia.

The eccentric 2 (FIGS. 1 and 2) may be constructed as a member co-axial to the driving shaft and having a toothing meshing with a second gear wheel on which then the eccentric is mounted.

As illustrated in FIG. 1 the eccentric according to FIGS. 1–3 may be accommodated in a trough 20 to be filled with oil. The eccentric with coupling permits higher rotational speeds than permissible with draw knives and draw hooks oscillating to-and-fro; losses in wear and power are reduced thereby. The production is less expensive and the whole can be housed in a considerably smaller space.

What I claim as my invention and desire to secure by Letters Patent is:

1. A shed-forming device for looms having a plurality of healds, comprising in combination: a driving shaft, a plurality of eccentrics mounted idly on said shaft, linkage means associated with each of said eccentrics for operably connecting same with a corresponding one of the healds so that the extreme positions of said eccentric correspond to the high shed and low shed positions, respectively, of their corresponding healds, a plurality of coupling means each comprising a wedge and spring-biased roller bodies, each of said coupling means being associated with one of said eccentrics and capable of coupling the same to said driving shaft, a pattern card mechanism in controlling connection with said shaft, control members actuated by said pattern card mechanism and controlling said coupling means so as to alternately engage and disengage the latter in accordance with the actual pattern of said mechanism, said linkage means having transmission members for operatively connecting each of said eccentrics with its corresponding heald.

2. A shed-forming device for looms having a plurality of healds, comprising in combination: a driving shaft, a plurality of eccentrics mounted idly on said shaft, linkage means associated with each of said eccentrics for operably connecting same with a corresponding one of the healds so that the extreme positions of said eccentrics correspond to the high and low shed positions, respectively, of their corresponding healds, a plurality of double-acting couplings each comprising a wedge and spring-biased roller bodies, each of said couplings being associated with one of said eccentrics and capable of coupling its associated eccentric to said driving shaft in both senses of rotation.

3. A shed-forming device for looms having a plurality of healds, comprising in combination: a driving shaft, a plurality of eccentrics mounted idly on said shaft, linkage means associated with each of said eccentrics for operably connecting same with a corresponding one of the healds so that the extreme positions of said eccentrics correspond to the high and low shed positions, respectively, of their corresponding healds, a plurality of single-acting couplings each comprising a wedge and spring-biased roller bodies, each of said couplings being associated with one of said eccentrics and capable of coupling its associated eccentric to said driving shaft in one sense of rotation only, a pattern card mechanism in controlling connection with said eccentrics, control members actuated by said pattern card mechanism and controlling said coupling means so as to alternately engage and disengage the latter in accordance with the actual pattern on said mechanism, said linkage means having transmission members connecting each of said eccentrics with its associated heald.

4. A shed-forming device for looms having a plurality of healds comprising in combination: a driving shaft having at least one shallow longitudinal groove, a plurality of eccentric discs mounted idly on said shaft, in each said disc a wedge guided in the radial direction, a double-armed lever pivotally mounted in said eccentric disc about an axis parallel to said shaft and with one arm co-operating with said wedge, a pair of rolling bodies interposed in said groove between said wedge and said shaft and spring-biased towards the apex of said wedge, stationary abutments slidably radially relative to the axis of said driving shaft and capable of co-operating with the other arm of said double-armed lever, a pattern card mechanism in controlling connection with said eccentric discs, control members operatively connecting said slidable stationary abutments to said pattern card mechanism, said abutments when under the action of said pattern card mechanism moving into contact with one arm of their associated double-armed lever and deflecting the same, the other arm of said lever forcing said wedge between said rolling bodies against their spring bias and jamming the same against said driving shaft, thereby temporarily coupling said eccentric disc to said shaft, an eccentric rod mounted on each of said eccentric discs, and linkage means for operatively connecting said eccentric rod to one of the healds.

5. A shed-forming device as claimed in claim 4, wherein said abutments are slidably mounted on said eccentric rod diametrically of said shaft.

6. A shed-forming device as claimed in claim 5, comprising a yoke connecting said abutments to one another, and spring means mounted on said eccentric arm biasing said yoke toward one of said control members.

References Cited by the Examiner

UNITED STATES PATENTS

| | | | |
|---|---|---|---|
| 1,256,644 | 2/18 | Barlow | 139—66 |
| 1,504,881 | 8/24 | Eggart | 139—57 |
| 2,687,148 | 8/54 | Pfarrwaller | 139—79 X |

FOREIGN PATENTS

| | | |
|---|---|---|
| 965,037 | 2/50 | France. |
| 1,201,358 | 7/59 | France. |
| 703,280 | 2/54 | Great Britain. |
| 262,325 | 1/29 | Italy. |

RUSSELL C. MADER, *Primary Examiner.*

DONALD W. PARKER, *Examiner.*